United States Patent [19]

Nonomura et al.

[11] 4,386,352
[45] May 31, 1983

[54] MATRIX TYPE LIQUID CRYSTAL DISPLAY

[75] Inventors: Heisaku Nonomura, Nara; Keiichiro Shimizu, Yamatokoriyama; Kohei Kishi, Tenri; Hisashi Uede, Yamatokoriyama, all of Japan

[73] Assignee: Sharp Kabushiki Kaisha, Osaka, Japan

[21] Appl. No.: 229,846

[22] Filed: Jan. 30, 1981

Related U.S. Application Data

[63] Continuation of Ser. No. 10,322, Feb. 7, 1979.

[30] Foreign Application Priority Data

Feb. 8, 1978 [JP] Japan .................................. 53-13766
Feb. 8, 1978 [JP] Japan .................................. 53-13767
Feb. 13, 1978 [JP] Japan .................................. 53-15583

[51] Int. Cl.³ .............................................. G09G 3/36
[52] U.S. Cl. .................................. 340/784; 340/719; 350/333
[58] Field of Search .................. 340/719, 784; 350/333

[56] References Cited

U.S. PATENT DOCUMENTS

| | | | |
|---|---|---|---|
| 3,824,003 | 7/1974 | Koda et al. | 340/784 X |
| 3,862,360 | 1/1975 | Dill et al. | 340/784 X |
| 4,062,626 | 12/1977 | Kawakami et al. | 340/784 X |
| 4,112,333 | 9/1978 | Asaks et al. | 340/784 X |
| 4,158,860 | 6/1979 | Irie et al. | 350/333 X |

*Primary Examiner*—David L. Trafton
*Attorney, Agent, or Firm*—Birch, Stewart, Kolasch & Birch

[57] ABSTRACT

A matrix type display panel is disclosed which comprises a plurality of gate lines, a plurality of source lines normal to the gate lines, a pair of substates with one carrying a thin film transistor (TFT) array including a plurality of TFTs one for each of the intersections of the gate and source lines and the other carrying a common electrode and liquid crystal material interposed between the TFT array and the common electrode. The common electrode is supplied with the voltage of which the waveform is different between odd scanning frames and during even scanning frames. In a write mode, the source line is supplied with a pair of positive and negative pulses during the odd scanning frames and with the zero voltage during the even scanning frames. In a non-write mode, on the other hand, the source line is supplied with the zero voltage during the even scanning frames and with a pair of positive and negative pulses during the odd scanning frames.

14 Claims, 15 Drawing Figures

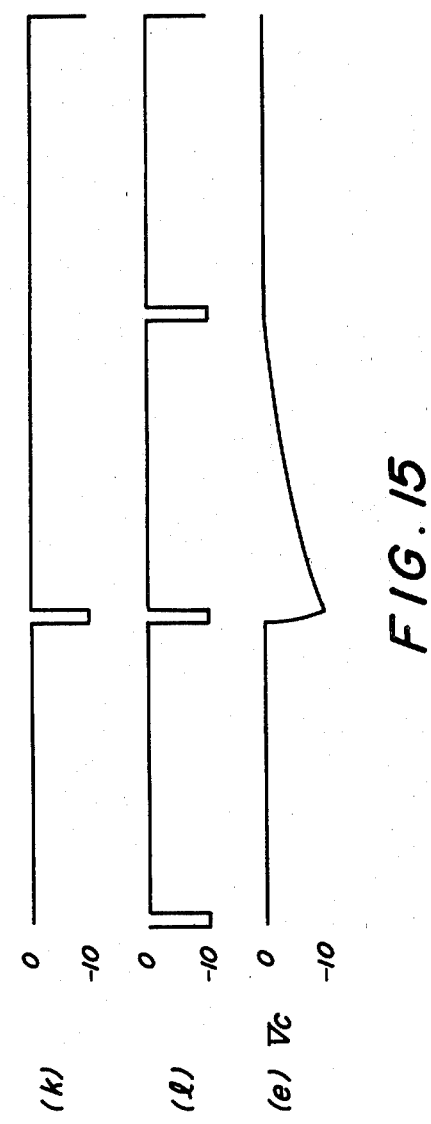

MATRIX TYPE LIQUID CRYSTAL DISPLAY

This application is a continuation, of copending application Ser. No. 10,322, filed on Feb. 7, 1979.

BACKGROUND OF THE INVENTION

The present invention relates to a liquid crystal display, and more particularly to a circuit using thin film transistors (referred to as "TFT" hereinafter) for enabling a matrix type liquid crystal display.

In 1972, Westinghouse Electric Co. introduced a new concept of a matrix type liquid crystal display panel wherein a transistor and a parasitic capacitor were implemented with thin film technology for each of picture elements.

While details of specification of such panel are fully apparent from "A 6"×6"20 1/inch Liquid Crystal Display Panel", by T. P. Brody et al, IEEE Trans. on Electron Devices EC-20 P 995, 1973, its structure and operating principle will be briefly discussed in according to such technical article to give a better understanding of the present invention.

FIG. 1 shows a circuit including a TFT and a parasitic capacitor for a respective one of picture elements of the panel and FIG. 2 shows enabling voltage waveforms associated with the circuit of FIG. 1. In the given example the picture elements are only four and aligned in an X-Y matrix to provide a visual matrix display through a proper wiring pattern.

If the source voltage $V_1$ and the gate voltage $V_1$ are applied from the source electrode 1 and the gate electrode 2 of FIG. 1, then the TFT 3 is placed into the conductive (ON) state so that the parasitic capacitor $C_S$ 5 in parallel with the capacitor $C_{LC}$ 4 of the liquid crystal material is charged via the ON resistance $R_{ON}$ of the TFT from the source electrode 1. Therefore, the potential (V drain 1) at the drain electrode 6 varies pursuant to the following formula (1):

$$V \text{ drain } 1 = V_1(1 - e^{-t/\tau_1}) \quad (1)$$

wherein $$\tau_1 = R_{ON}(C_{LC} + C_S)$$

Then, if the gate voltage at the gate electrode 2 is charged to $-V_2$, the TFT 3 is turned to the cut-off (OFF) state. This leads to that the capacitors $C_{LC}$ and $C_S$ 5 start discharging the cumulative charge thereon through the OFF resistance $R_{OFF}$ of the TFT 3 and the resistance $R_{LC}$ of the liquid crystal material. Since the resistances $R_{OFF}$, $R_{LC}$ and $R_{ON}$ are correlated as follows, $$R_{OFF} >> R_{ON}, R_{LC} > R_{OFF}$$

the process of discharging goes on quite slowly such that the potential (V drain 2) at the drain electrode is held considerably high for a relatively long period of time as defined by the following formula:

$$V \text{ drain } 2 = V_1 e^{-t/\tau_2} \quad (2)$$

wherein $$\tau_2 = (R_{OFF}//R_{LC})(C_{LC} + C_S)$$

As the history of these processes is apparent from the voltage waveform chart of FIG. 2, the effective voltage at the drain electrode, namely, the effective voltage developing across the liquid crystal unit element is remarkably high and assures a high contrast display irrespective of the voltage applied to the source electrode 1 with a small duty factor and a very low effective value.

The cell structure which operates pursuant to the above described principle is illustrated in FIG. 3, which generally comprises a thin film transistor array substrate 22 and a counter substrate 23. The former carries the TFT 3, the capacitor 5 and one electrode 11 deposited on a glass support 7 by a well known evaporation method and aligned in the X-Y coordinates with X and Y leads for each of the liquid crystal unit elements, whereas the latter carries an entire transparent, conductive film 17 common to all the unit elements deposited on another glass support 7'. Both electrode substrates are subject to a conventional TN (twisted nematic) alignment process such as slant evaporation and rubbing after transparent insulating layers 14 and 15 of SiO, $SiO_2$, etc. are deposited thereon. In addition, both substrates are bonded together via a sealing member 21 and a proper liquid crystal material such as TN-FEM liquid crystal and guest host effect liquid crystal is injected therebetween, completing the fabrication of a matrix type liquid crystal display panel using the TFTs. At last, a pair of polarizers 18, 19' and a reflector 2 are disposed outside the matrix type liquid crystal panel.

In FIG. 3, 8 designates the gate electrode of Al or the like; 9 designates an electrode of the capacitor $C_S$; 10 designates a gate insulating film of the TFT and a dielectric film of the capacitor $C_S$; 11 designates an electrode pad of the liquid crystal element; 12 designates the source electrode; 13 designates the drain electrode; and 24 designates a semiconductor layer.

Nevertheless, two basic problems have been experienced in enabling the above illustrated display panel with enabling voltages as indicated in FIG. 2.

(1). When viewing waveforms of enabling voltages as indicated in FIG. 4 to enable all the picture elements other than one selected by a specific source electrode $S_i$ and a specific gate electrode $G_j$, the TFT for the selected or disabled one remains in the cut-off (OFF) state but the capacitors $L_{LC} + C_S$ are progressively charged via the OFF resistance $R_{OFF}$. It is therefore possible that a voltage more than a given threshold voltage level $V_{th}$ of the liquid crystal material may be applied thereto. The resulting voltage is in the form as indicated in FIG. 4 and on-off switching is effected between the source voltage $V_{si}$ and the gate voltage $V_{Gj}$ so that, while the TFT is in the OFF state, the drain voltage $V_{Dij}$ bears an increased effective value equal to or higher than that in the ON state. This causes an objectionable visual display or a difference in contrast corresponding to the number of the liquid crystal elements enabled at this moment.

(2). As long as the voltage-current characteristics ($V_D$-$I_D$) of the TFT are symmetric with respect to the polarity, an ideal waveform of drain voltage which contains no d.c. component is available as shown in FIG. 2(C). However, the operating characteristics ($V_D$-$I_D$) of conventional TFTs are in fact asymmetic with respect to the polarity as viewed from FIG. 6. The waveform of the drain voltage, namely, the voltage applied across the liquid crystal material is further asymmetric as viewed from FIG. 2(d). Thus, there is the likelihood of supplying the liquid crystal material with a voltage inclusive of a d.c. component and shortening life of the liquid crystal panel.

Accordingly, in order to overcome these two problems, Westinghouse Electric Co. devoted the research activities to the development of TFTs with excellent operating properties in which $R_{ON}/R_{OFF} \approx 70,000$ and thus leak current in the OFF state does not amount less than 5 nA whereas on current is as high as 350 μA. Such attempt was not fully successful because of incomplete removal of the d.c. component.

SUMMARY OF THE INVENTION

It is therefore an object of the present invention to provide an enabling circuit for a liquid crystal display panel which is free of the above discussed problems.

According to the present invention, there is prepared a matrix type display panel which comprises a plurality of gate lines, a plurality of source lines normal to the gate lines, a pair of substrates with one carrying a thin film transistor (TFT) array including a plurality of TFTs one for each of the intersections of the gate and source lines and the other carrying a common electrode and liquid crystal material interposed between the TFT array and the common electrode. In one aspect of the present invention, the common electrode is supplied with the voltage of which the waveform is different between during odd scanning frames and during even ones. The voltage of which the phase is 180° out of that of the voltage applied to the common electrode is supplied to a specific picture element of the panel to be written, supplying an alternating voltage to the liquid crystal material. For a specific picture element not to be written, on the other hand, there is provided the voltage of which the phase is inphase with that applied to the common electrode, supplying no substantial voltage to the liquid crystal material. In another aspect of the present invention, source voltage supplied from the source line is bipolar and thus positive and negative alternatively with each other. A pulse width ratio of the positive one to the negative is so selected that charging and discharging voltages in the forward and backward directions are both zero when the TFT is off.

BRIEF DESCRIPTION OF THE DRAWINGS

FIGS. 14 and 15 are a circuit diagram and a timing diagram of an exemplary circuit for producing voltage waveforms $V_{cj} - V_{cj+2}$.

DETAILED DESCRIPTION OF THE INVENTION

As noted earlier, the present invention is powerful to overcome the two problems associated with the prior art device. To resolve the first problem ①, the liquid crystal display panel is enabled in accordance with a timing diagram of FIG. 7.

FIG. 7(a), waveform shows the waveform of the source voltage $V_{si}$ which is applied to the (i)th source electrode and has positive and negative polarity components. A pulse width ratio of the positive and negative polarity components is such selected that charging and discharging are effected in the positive and negative directions to reduce an effective voltage value to zero, when the TFT is in the OFF state, in order to compensate for variations in the characteristics with respect to the positive and negative polarities. FIG. 7(a), waveform illustrates the voltage at the source electrode when the picture elements on the (i)th source electrode are subject to the write operation and non-write operation alternatively with respect to each other. It will be noted that the positive and negative pulses of the source voltage are reversed in phase between the odd and even frames.

Figure 7:
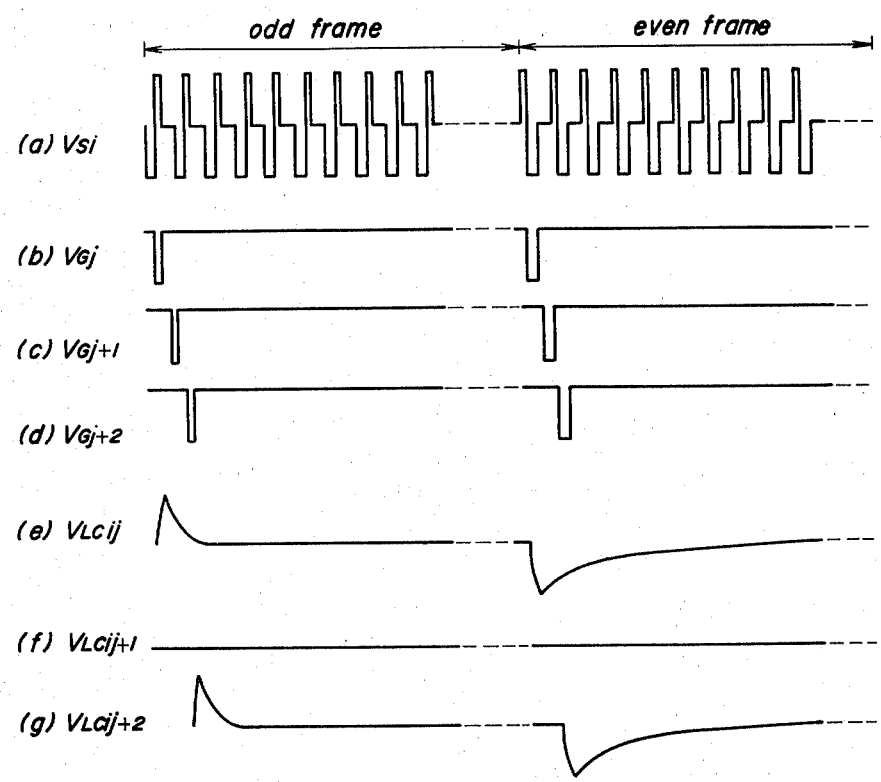
FIG. 7 is a timing diagram of a method of enabling a liquid crystal display according to the present invention.

FIG. 7, waveforms (b)-(d) illustrate waveforms of the gate voltages $V_{Gj}$, $V_{Gj+1}$ and $V_{Gj+2}$ at the (j)th gate electrode through the (j+2)th gate electrode which are to be scanned in sequence. In the case where the positive pulse of the gate voltage is applied to the liquid crystal material in conformity with the pulse width of the source voltage, there is applied the gate pulse of the same pulse width as that of the negative pulse of the source voltage. It will be noted that the positive and negative pulses are applied during the odd and even frames, respectively.

Accordingly, the source voltage $V_{si}$ is applied when it is desired to write intelligence signals onto the electrodes sequentially supplied with the gate pulses as seen from FIG. 7 waveforms (b)-(d). The respective electrodes are held at the zero potential when it is not desired to write. In the example as shown in FIG. 7, the (i, j)th and (i, j+2)th picture elements are written whereas the (i, j+1)th picture element is not written. The source voltage $V_{si}$ at the (i)th is the voltage waveform which defines the write interval and the non-write interval with respect to the (i)th column picture elements.

The display operation is executed on the liquid crystal material in such a way that the respective ones of the picture elements selected by the source voltage and the gate pulse are supplied with the voltage which alternates in polarity at every field as seen from FIG. 7 waveforms (e)-(g).

Figure 4:
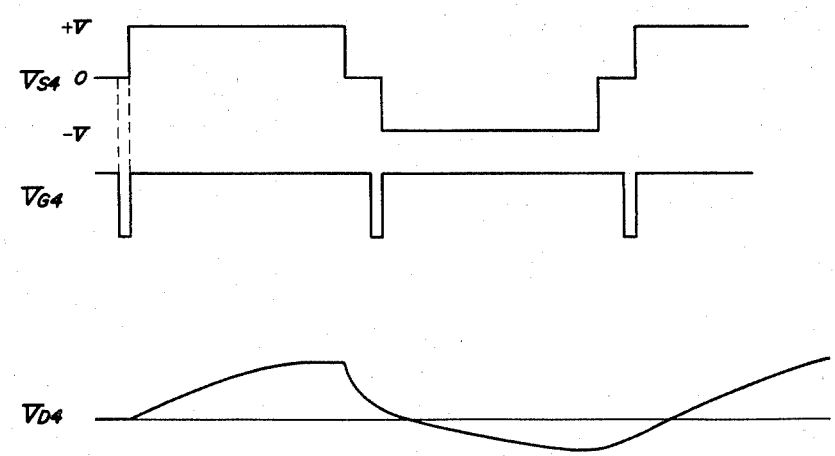
FIG. 4 is a timing diagram showing a specific enabling state of the circuit of FIG. 1.
Figure 5:
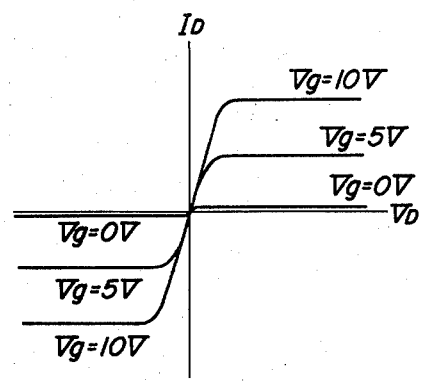
FIG. 5 is a voltage-current graph of an ideal TFT.
Figure 6:
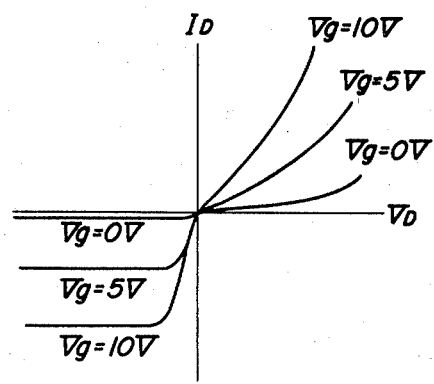
FIG. 6 is a voltage-current graph of a TFT using Te as semiconductor material.

As stated above, according to the present invention, the source voltage is bipolar including the positive and negative components and of the varying pulse width to reduce the charging and discharging voltages to zero in the opposing directions when the TFT is off. Even if nothing but one picture element is not desired to write as indicated in FIG. 4, such non-write picture element would never be supplied with voltage because of crosstalk. Thus, the non-write picture element is written by no means. The display panel of the present invention enjoys a higher contrast and avoids any substantial difference in proportion to the number of the picture elements to be written.

The findings of the inventors' experiments demonstrated that the following pulse width ratios were suitable when the TFT comprised tellurium as semiconductor material:

$$\frac{\text{pulse width of positive pulse}}{\text{pulse width of negative pulse}} = 0.2 - 0.05$$

One effective way to avoid the above mentioned problem 2 according to the present invention will be described below with reference to a timing diagram of FIG. 8.

Figure 8:
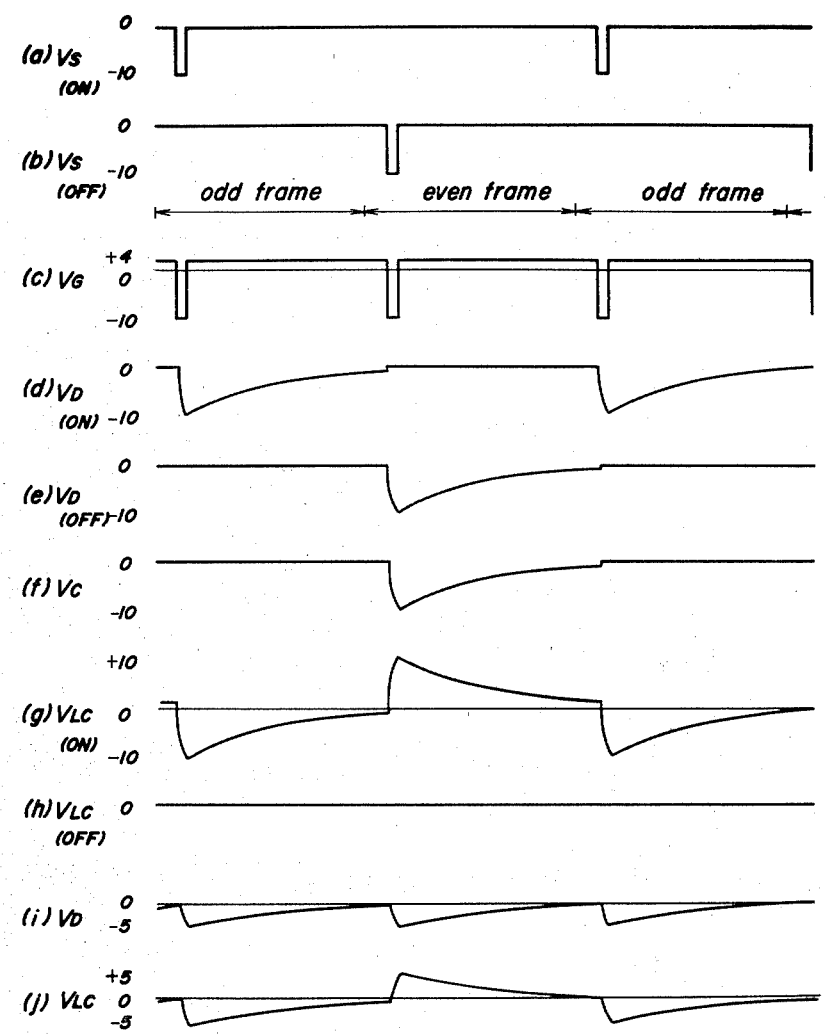
FIG. 8 is a timing diagram of another method of enabling the display according to the present invention.

When it is desired to write a selected one of picture elements, the unidirectional source voltage pulse $V_s$ as shown in FIG. 8, waveform (a) is supplied to the source electrode of its associated TFT. The source voltage pulse is a negative one in the case where the TFTs are made of Te and a positive one in the case where they are made of CdS or CdSe. The gate voltage pulse $V_G$ as seen from FIG. 8, waveform (c) is applied in such a way that the TFT is off during the odd frames and on during the even frames. Since the TFTs are turned on during the odd frames and turned off during the even frames as seen from FIG. 8, waveforms (a) and (c), the drain voltage $V_D(ON)$ of the TFTs will be in the waveform (d) of FIG. 8. The waveform (d) of FIG. 8 illustrates only the negative voltage side and, of course, includes a d.c. component. Pursuant to the teachings of the present invention, the common voltage $V_c$ with the opposite polarity as seen from FIG. 8, waveform (f) is supplied from the common electrode during the even frames. As a result, a differential voltage between the voltages of FIG. 8, waveforms (d) and (f), namely, the voltage waveform (g) of FIG. 8 is applied across the liquid crystal material to perform the write operation. it is concluded from FIG. 8, waveform (g) that a voltage value and a waveform of the common voltage $V_c$ may be properly selected in line with the drain voltage $V_D$ for supply of an alternating voltage including no d.c. component to the liquid crystal panel.

When a selected picture element of the liquid crystal material is not desired to be written, the source electrode of its associated TFT is supplied with the source voltage $V_s(OFF)$ as seen from FIG. 8, waveform (b) together with the gate voltage pulse $V_G$ of FIG. 8, waveform (c) in the way that the TFT selecting that picture element is turned off during the odd frames and off during the even frames. Therefore, the drain voltage $V_D(OFF)$ of the TFT is in the waveform (e) as in FIG. 8 and supplied to one electrode of the picture element of the liquid crystal material. The common voltage $V_c$ as seen from FIG. 8, waveform (f) is supplied from the common electrode during the odd frames with the resulting similarlity in voltage polarity and waveform. Therefore, no potential difference stands between the two opposing electrodes of the panel with the drain voltage $V_D(OFF)$ as indicated in FIG. 8, waveform (h).

Figure 1:
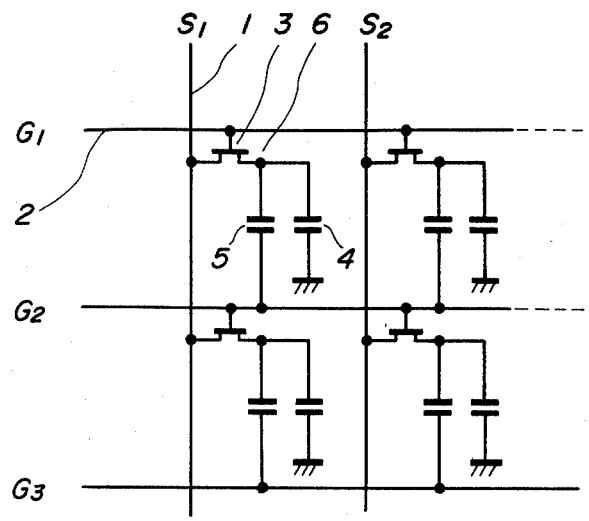
FIG. 1 is a circuit diagram of a prior art matrix type liquid crystal display using TFTs.
Figure 2:
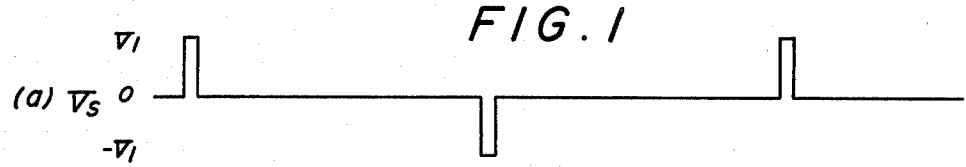
FIG. 2 is a timing diagram for the illustration of operation of the circuit of FIG. 1.
Figure 2:
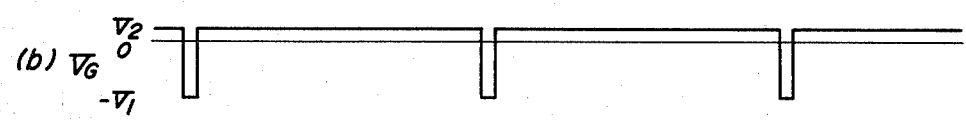
Figure 2:
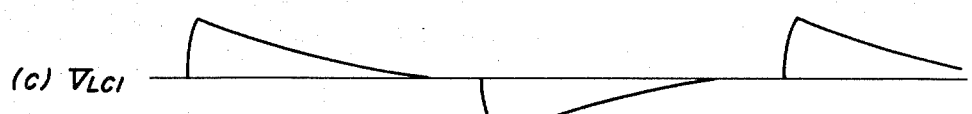
Figure 2:
Figure 3:
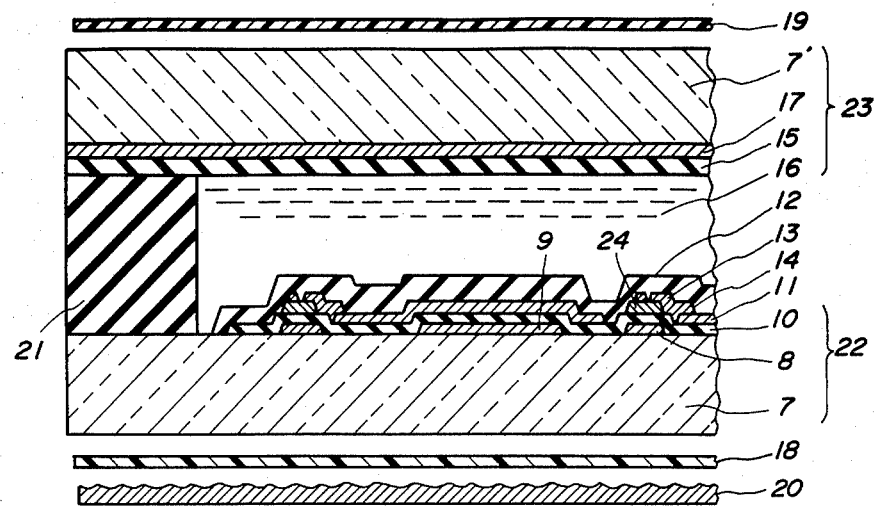
FIG. 3 is a cross sectional view of a matrix type liquid crystal display using TFTs used with the present invention.
Figure 10:
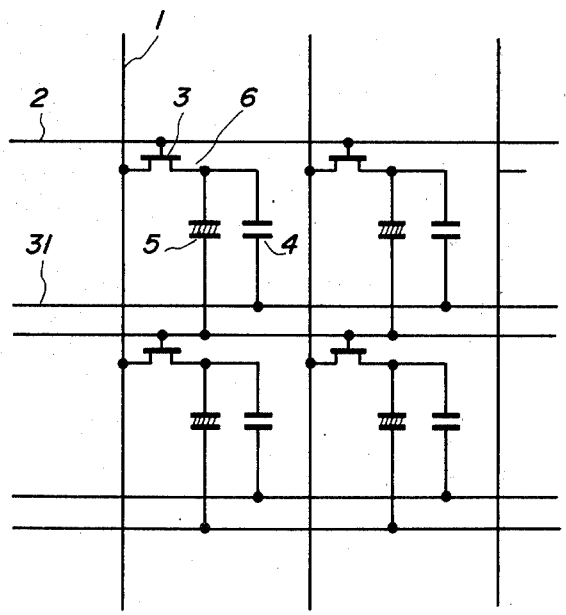
FIG. 10 is an equivalent circuit diagram of the liquid crystal display according to the present invention.
Figure 9:
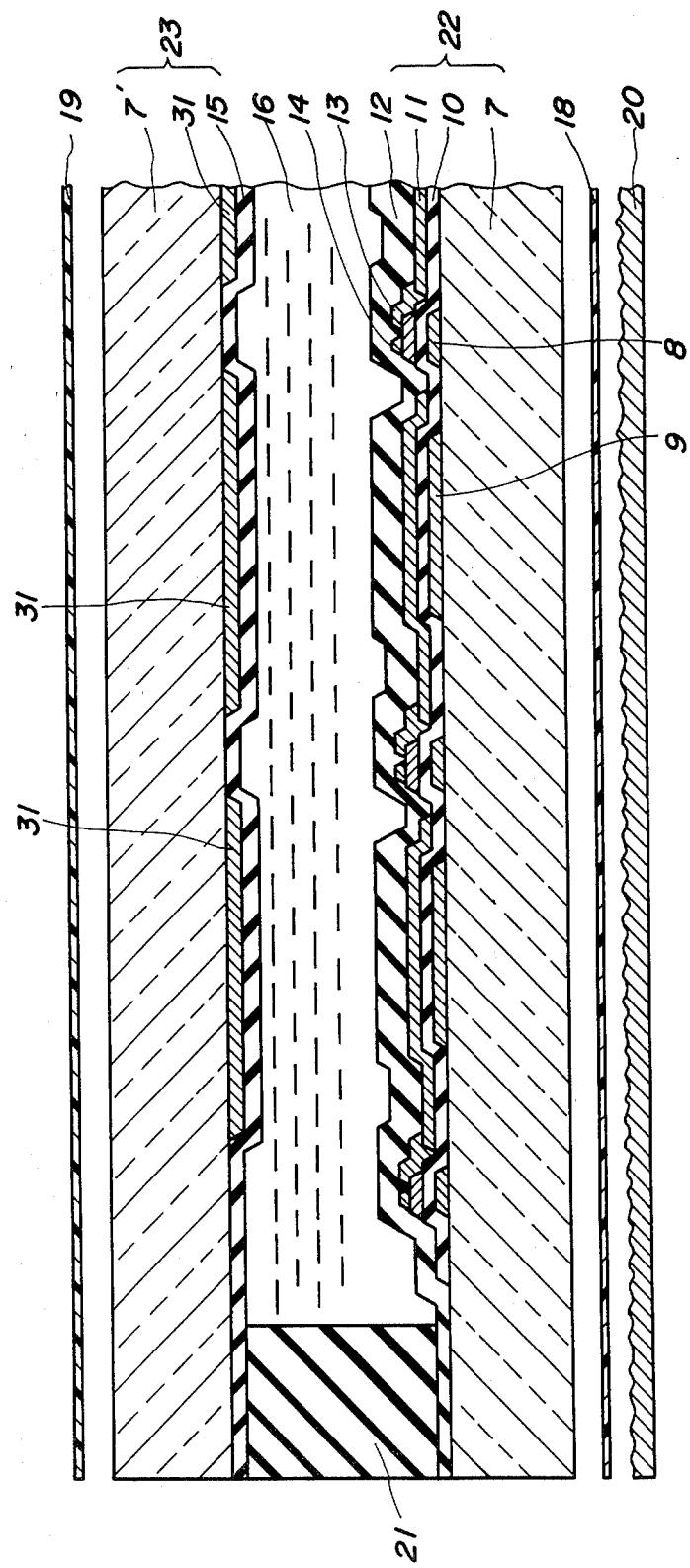
FIG. 9 is a cross sectional view of a liquid crystal display according to the present invention.
Figure 11:
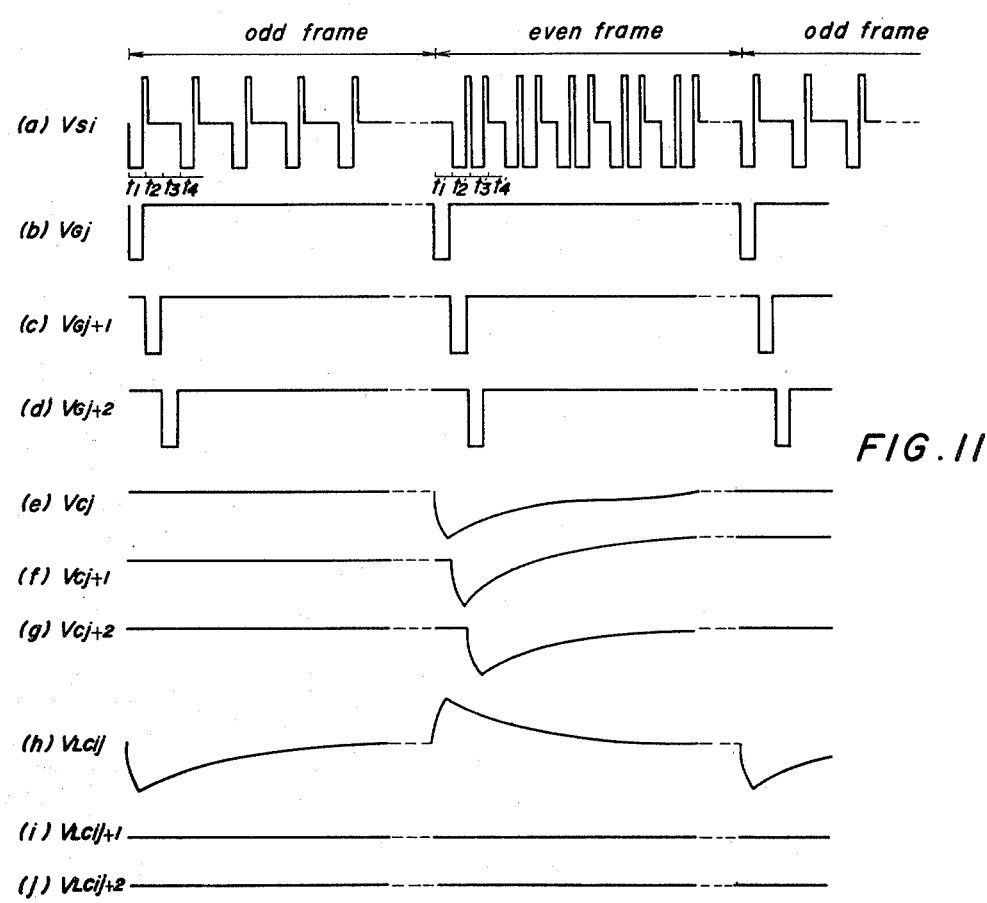
FIG. 11 is a timing diagram of still another way of enabling the display according to the present invention.

In order to apply the common voltage $V_C$ to the common electrode of the liquid crystal panel in conformity with the uniformly spaced or scanned gate electrode S in the above embodiments, it is necessary to make the transparent conductive film in a stripe-like form in parallel with the gate electrodes. A cross sectional view of the resulting liquid crystal display panel is illustrated in FIG. 9 and an equivalent circuit diagram thereof is illustrated in FIG. 10. The similar components in FIGS. 9 and 11 are given the same reference numbers as in FIGS. 1 and 3.

If it is desired to provide a half-tone display, the amplitude of the source voltage $V_s$ and the common voltage should be varied in accordance with degree of writing. The drain voltage and the applied voltage across the liquid crystal material are illustrated in FIG. 8, waveforms (i) and (j).

As stated earlier, according to the present invention, the specific point in time where the TFT is turned on or off differs between the odd and even frames. At the same moment the voltage is so applied either from the TFT or from the common electrode as to supply a selected one of the picture elements on the display panel with the write voltage or to reduce the write voltage to zero. Accordingly, the TFTs are responsive to only good property unidirectional pulses and achieves highly efficient enabling so that the panel is enabled with alternating voltage including no d.c. component to enjoy a relatively longer life.

As is obvious from FIG. 7, the voltage waveform (c) applied across the liquid crystal material in the approach to the first problem ① is asymmetric with respect to the positive and negative polarities and contains a substantial amount of a d.c. component. In constrast, the approach to the second problem ② is not powerful to overcome the first problem ① .

Still another embodiment of the present invention is an effective measure to overcome both problems ① and ② , as seen from a timing diagram of FIG. 11. Construction of the liquid crystal display panel is same as in FIG. 9 and its equivalent circuit as in FIG. 10.

FIG. 11, waveform (a) shows the waveform of the source voltage on the (i)th column whereby the respective picture elements are enabled repeatedly in the sequence of the write operation, the non-write operation and the non-write operation. The negative and positive pulses are applied during the period from $t_1$ up to $t_2$ and the zero voltage during the periods from $t_2$ to $t_3$ and from $t_3$ to $t_4$.

In order that the TFTs are turned on, off and off during the period from $t_1$ to $t_4$ within the odd frames and turned off, on, and on during the period from $t_1'$ to $t_4$ within the even frames, the source voltage is designed together with the gate voltage such that the zero voltage stands from $t_1$ to $t_2$ and the negative and positive pulses are applied from $t_2$ to $t_3$ and the negative and positive pulses are applied from $t_3$ to $t_4$.

A pulse width ratio of the negative to the positive pulse is established as illustrated with respect to FIG. 7. FIG. 11, waveform (b) depicts the waveform of the gate voltage on the (j)th line, FIG. 11, waveform (c) on the (j+1)th line and FIG. 11, waveform (b) on the (j+2) line. As is indicated in FIG. 11, waveforms (b) and (d), the gate voltage pulse is sequentially applied to the gate electrodes for sequentially scanning the gate electrodes. FIG. 11, waveforms (e) and (g) depict waveforms of the common voltage applied to the common electrode on the (j)th through (j+2)th lines, wherein the common electrodes $V_{cj}$, $V_{cj+1}$ and $V_{cj+2}$ are supplied to the common electrodes on the same line as the gate electrodes being scanned, during the even frames.

From the foregoing, it is clear that during the odd frames the source voltage on the (i)th column and the gate voltage on the (j)th line are supplied to turn on the TFT at the intersection (i, j) so that the liquid crystal material at the specific picture element (i, j) is supplied with the source voltage and hence the voltage $V_{LCij}$. This results in writing the specific picture element (i, j).

Since during the next succeeding line scanning the source voltage on the (i)th column is zero at the odd interval, the TFT at the intersection (i, j+1) is in the off state and the voltage $V_{LCij+1}$ across the (i, j+1) picture element is also zero.

The same procedure will be repeated during the second succeeding (j+2) line without performing the write operation. The procedure continues up to the last line to complete one frame scanning.

During the next succeeding frame, that is, the even frame the operation of the TFTs is reversed. This is because the source voltage is supplied in association with voltage supply to the gate electrode in such a way that the TFT (i, j) is off and the (i, j+1) is on and the TFT (i, J+2) is on. With respect to the picture element of which the associated TFT is off, the voltage is supplied from the common electrode so that the liquid crystal material is supplied with the voltage in the direction opposite to that during the odd frame scanning (see FIG. 11, waveform (h)). For the picture element with the TFT in the on state, the liquid crystal material is supplied with the source voltage $V_{si}$ and the common voltages $V_{Cj+1}$ and $V_{Cj+2}$ at the same time. Since these voltages are identical in polarity, waveform and magnitude, no voltage is therefore applied as best seen from FIG. 11, waveforms (i) and (j). The above mentioned embodiment makes it possible to overcome the problems ① and ② .

While in accordance with the teachings of the present invention the common electrode is aligned in a stripe-like form to render the manufacture of the liquid crystal panel and the enabling circuit somewhat complicated, it is possible to use the TFTs even with poor $R_{OFF}/R_{ON}$ and perform an ideal enabling operation as long as there is no difference in operating performances from one TFT to another. The findings of the inventor's experiments indicated that a 128 line matrix display bears as high contrast as in a conventional static mode through the use of elements with $R_{OFF}/R_{ON} \approx 300$.

The elements of which the ratio of the off resistance to the on resistance is approximately 300 are available thanks to the present invention when implemented the enabling circuit of the present invention. Te can be therefore used as semiconductor material and CdS, CdSe, PbS, etc. can be also used.

Figure 13:
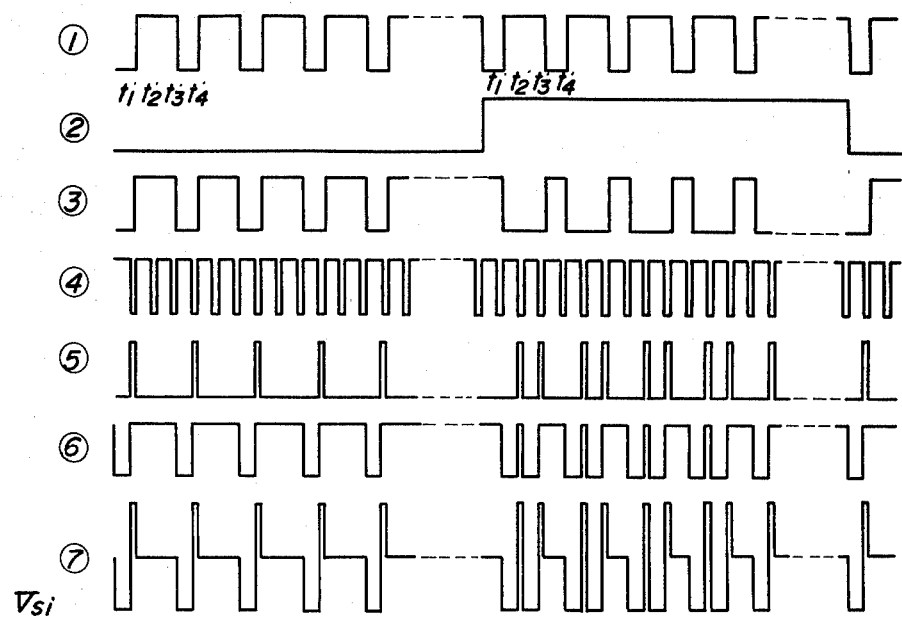
FIGS. 12 and 13 are a circuit diagram and a timing diagram of an exemplary circuit for producing the source voltage.
Figure 12:
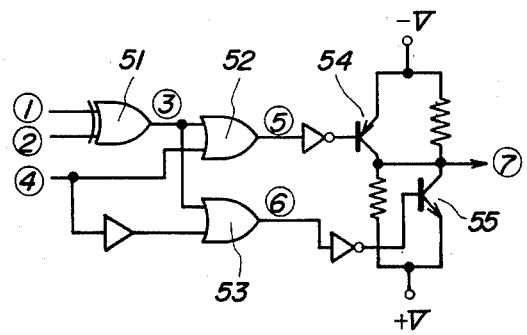
Figure 14:
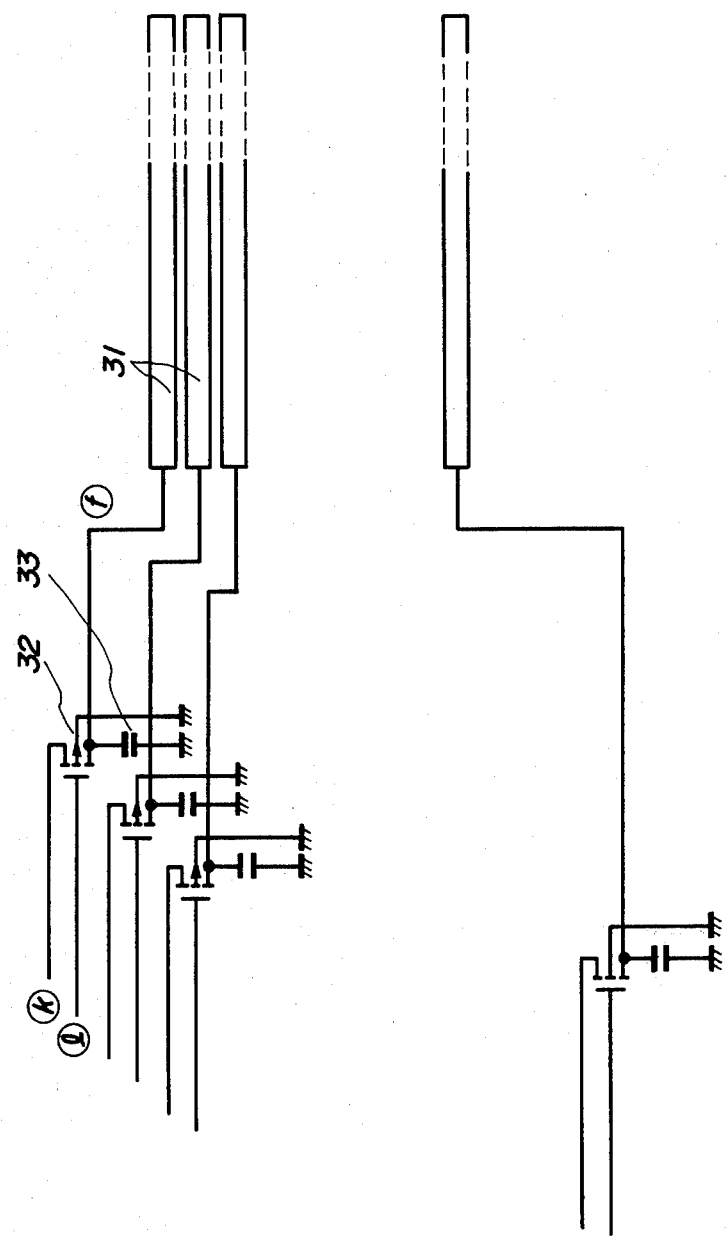

FIGS. 12 and 13 show a concrete circuit for producing the source voltage $V_{si}$ which is to be supplied to the source electrode of the TFT. This includes generally an exclusive OR logic circuit 51, a pair of OR logic circuits 52, 53 and a pair of bipolar transistors 54, 55. Operation of the circuit is obvious to those skilled in the art from reference to FIG. 13. In FIGS. 14 and 15, there is illustrated an example of a circuit adapted to generate the common voltages $V_{cj}$-$V_{cj+2}$, which includes a P-channel MOS FET 32 and a capacitor 33.

The invention being thus described, it will be obvious that the same may be varied in many ways. Such modifications are not to be regarded as a departure from the spirit and scope of the invention, and all such modifications are intended to be included within the scope of the following claims.

What is claimed is:

1. A matrix type display device and driving system comprising:
a matrix panel including,
a plurality of gate lines,
a plurality of source lines disposed normal to said gate lines and forming a plurality of intersections therebetween;
a plurality of transistors, one of said transistors disposed at each of the intersections between said gate lines and source lines, each of said transistors having a control terminal and first and second controlled terminals, the first controlled terminal of each of said transistors being connected to a respective one of said source lines, the gate terminal of each of said transistors being connected to a respective one of said gate lines;
a plurality of common lines disposed normal to said source lines;
liquid crystal material disposed between said common lines and the second controlled terminals of said transistors, said liquid crystal material forming a plurality of liquid crystal matrix display elements, each element corresponding to a respective transistor and having first and second element terminals, the first element terminal of each of said display elements being connected to the second controlled terminal of its respective transistor, the second element terminal being connected to a respective common line; and
capacitance means disposed between the second controlled terminal of each transistor and one of said gate lines not connected to that transitor;
source line driving means for driving each of said source lines with a first voltage waveform and subsequently driving each of said source lines with a second voltage waveform, said source line driving means alternately and sequentially driving said source lines with said first and second voltage waveforms;
gate line driving means for periodically and sequentially driving each of said gate lines with individual gate pulses;
said first and second waveforms each having a period equal to the time necessary to sequentially address all of said gate lines, each of said first and second voltage waveforms being divided into a plurality of waveform portions, each corresponding to an individual gate pulse and thus to the coloration state of a respective individual display element;
each individual waveform portion of said first waveform including positive and negative voltage components of substantially equal voltage greater than the coloration threshold of said display when the respective individual display element is driven into coloration, said each individual waveform portion of said first waveform being of substantially zero voltage in the absence of desired coloration of said respective element;
each individual waveform portion of said second waveform including positive and negative voltage components of substantially equal voltage greater than the coloration threshold of said display to drive its respective individual display element in the absence of a desired coloration, said each individual waveform portion of said second waveform being substantially zero when coloration of its respective display element is desired;
said individual gate pulses driving their respective transistors to apply a first applied voltage waveform to the first element terminal of the respective display element when a waveform portion having said positive and negative voltage components is applied to said first controlled terminal of said transistor; and common line drive means for applying a second applied voltage waveform corresponding to the first applied voltage waveform but of opposite polarity to each common line in synchronism with the application of a respective gate pulse during the application of said second waveform.

2. The device and driving system of claim 5, wherein said capacitance means charges upon the application of said waveform portion having said positive and negative voltage components to produce a logrithmic first applied voltage waveform.

3. The device and driving system of claim 5, wherein said first applied voltage waveform cancels said second applied voltage waveform during the application of said second waveform to produce a net voltage of substantially zero across the respective display element and thus an absence of coloration in the respective element.

4. The device and driving system of claim 7, wherein said second applied voltage waveform produces a coloration of said display element when the respective individual waveform portion of said second applied voltage waveform is substantially zero.

5. The device and driving system of claim 5, wherein the respective individual waveform portions of said first and second waveforms contain said positive and negative voltage components in order to prevent the off resistance of said resistors from applying an undesired voltage to the uncolored display elements.

6. The device and driving system of claim 5, wherein said second applied voltage compensates for asymmetrical variations in the voltage-current characteristics of the transistors with respect to polarity by allowing said transistors to be driven with only one polarity.

7. A matrix type display device and driving system comprising:

a matrix display panel including;
a plurality of gate lines;
a plurality of source lines disposed normal to said gate lines and forming a plurality of intersections therebetween;
a plurality of transistors, one of said transistors disposed at each of the intersections between said gate lines and source lines, each of said transistors having a control terminal and first and second controlled terminals, the first controlled terminal of each of said transistors being connected to a respective one of said source lines, the gate terminal of each of said transistors being connected to a respective one of said gate lines;
a plurality of common lines disposed normal to said source lines;
liquid crystal material disposed between said common lines and the second controlled terminals of said transistors, said liquid crystal material forming a plurality of liquid crystal matrix display elements, each element corresponding to a respective transistor and having first and second element terminals, the first element terminal of each of said display elements being connected to the second controlled terminal of its respective transistor, the second element terminal being connected to a respective common line; and
capacitance means disposed between the second controlled terminal of each transistor and one of said gate lines not connected to that transistor;

source line driving means for driving each of said source lines with a first voltage waveform and subsequently driving each of said source lines with a second voltage waveform, said source line driving means alternately and sequentially driving said source lines with said first and second voltage waveforms;

gate line driving means for periodically and sequentially driving each of said gate lines with individual gate pulses;

said first and second waveforms each having a period equal to the time necessary to sequentially address all of said gate lines, each of said first and second voltage waveforms being divided into a plurality of waveform portions, each corresponding to an individual gate pulse and thus to the coloration state of a respective individual display element;

each individual waveform portion of said first waveform including a voltage pulse having a voltage greater than the coloration threshold of said display when the respective individual display element is driven into coloration, said each individual waveform portion of said first waveform being of substantially zero voltage in the absence of desired coloration of said respective element;

each individual waveform portion of said second waveform including a voltage pulse having a voltage greater than the coloration threshold of said display to drive its respective individual display element in the absence of a desired coloration, said each individual waveform portion of said second waveform being substantially zero when coloration of its respective display element is desired;

said individual gate pulses driving their respective transistors to apply a first applied voltage waveform to the first element terminal of the respective display element when a waveform portion having said voltage pulse is applied to said first controlled terminal of said transistor; and common line drive means for applying a second applied voltage waveform corresponding to the first applied voltage waveform but of opposite polarity to each common line in synchronism with the application of a respective gate pulse during the application of said second waveform.

8. The device and driving system of claim 7, wherein said capacitance means charges upon the application of said waveform portion having said voltage pulse to produce a logrithmic first applied voltage waveform.

9. The device and driving system of claim 7, wherein said first applied voltage waveform cancels said second applied voltage waveform during the application of said second waveform to produce a net voltage of substantially zero across the respective display element and thus an absence of coloration in the respective element.

10. The device and driving system of claim 9, wherein said second applied voltage waveform produces a coloration of said display element when the respective individual waveform portion of said second applied voltage waveform is substantially zero.

11. The device and driving system of claim 10, wherein said second applied voltage compensates for asymmetrical variations in the voltage-current characteristics of the transistors with respect to polarity by allowing said transistors to be driven with only one polarity.

12. A matrix type display device and driving system comprising:

a matrix display panel including;
a plurality of gate lines;
a plurality of source lines disposed normal to said gate lines and forming a plurality of intersections therebetween;
a plurality of transistors, one of said transistors disposed at each of the intersections between said gate lines and source lines, each of said transistors having a control terminal and first and second controlled terminals, the first controlled terminal of each of said transistors being connected to a respective one of said source lines, the gate terminal of each of said transistors being connected to a respective one of said gate lines;
liquid crystal material disposed between said common lines and the second controlled terminals of said transistors, said liquid crystal material forming a plurality of liquid crystal matrix display elements, each element corresponding to a respective transistor and having first and second element terminals, the first element terminal of each of said display elements being connected to the second controlled terminal of its respective transistor, the second element terminal being connected to a gate line not connected to said respective transistor; and
capacitance means disposed between the second controlled terminal of each transistor and one of said gate lines not connected to that transistor;
source line driving means for driving each of said source lines with a first voltage waveform and subsequently driving each of said source lines with a second voltage waveform, said source line driving means alternately and sequentially driving said source lines with said first and second voltage waveforms; and
gate line driving means for periodically and sequentially driving each of said gate lines with individual gate pulses;
said first and second waveforms each having a period equal to the time necessary to sequentially address all of said gate lines, each of said first and second voltage waveforms being divided into a plurality of waveform portions, each corresponding to an individual gate pulse and thus to the coloration state of a respective individual display elements;
said waveform portions having positive and negative components such that the off resistance of said transistors does not apply a net D.C. voltage to the uncolored display elements.

13. A system for driving a matrix type display device comprising:
a matrix display panel including a plurality of gate lines, a plurality of source lines disposed normal to said gate lines and forming a plurality of intersections therebetween and a plurality of common lines to each of said gate lines of said matrix panel;
a plurality of transistors, one of said transistors disposed at each of the intersections between said gate lines and said source lines, a first terminal of each said transistors being connected to one of said source lines, a second terminal of each said transistors being connected to one of said gate lines;
a plurality of capacitors, each of said capacitors having a first terminal connected to a third terminal of each of said transistors and a second terminal connected to one of said plurality of gate lines;
liquid crystal material disposed between said plurality of common lines and said plurality of gates lines;
source line driving means for driving the respective ones of said source lines with a first voltage waveform and for driving the remaining ones of said source lines with a second voltage waveform;
gate line driving means for sequentially driving said gate lines with a substantially periodic voltage waveform for scanning purposes;
common line driving means for driving said common lines with a common line voltage waveform;
wherein said first voltage waveform and said substantially periodic voltage waveform combine to yield a first resultant waveform at said third terminal of a selected number of said transistors located at the intersection between said one of said source lines and said gate lines, said first resultant waveform being different than said common line voltage waveform thereby resulting in a net voltage across said liquid crystal material associated with said selected number of said transistors, and
wherein said second voltage waveform and said substantially periodic waveform combine to yield a second resultant waveform at said third terminal of the remaining ones of said transistors, said second resultant waveform being substantially identical with said common line voltage waveform thereby resulting in a net zero voltage across said liquid crystal material associated with said remaining ones of said transistors, thus compensating for variations in the characteristics of said transistors with respect to positive and negative polarities.

14. A system for driving a matrix type display device comprising:
a matrix display panel including a plurality of gate lines, a plurality of source lines disposed normal to said gate lines and forming a plurality of picture elements therebetween and a plurality of common lines common to each of the gate lines of said matrix display panel;
a plurality of transistors, one of said transistors disposed at each of the picture elements between said gate lines and said source lines, a first terminal of each said transistors being connected to one of said source lines, a second terminal of each said transistors being connected to one of said gate lines;
a plurality of capacitors, each of said capacitors having a first terminal connected to a third terminal of each of said transistors;
liquid crystal material disposed between said plurality of common lines and said third terminals of said transistors;
gate line driving means for sequentially driving said gate lines with a substantially periodic voltage waveform for line scanning purposes;
common line driving means for producing a periodic waveform each predetermined interval of time including an odd scanning interval and an even scanning interval and for supplying said common lines with driving voltages which are different between during said odd scanning interval and said even scanning interval; and
source line driving means for supplying said source lines with information to be displayed and resulting in a first resultant voltage at said third terminal of a selected number of said transistors, said first resultant voltage being 180° out of phase with said voltage waveform applied to said common lines; and wherein said source line driving means further results in a second resultant voltage at said third terminals of the remaining ones of said transistors, said second resultant voltage being in-phase with said voltage waveform applied to said common lines and thus resulting in a net zero voltage across said liquid crystal material associated with said remaining ones of said transistors.

* * * * *